US006838406B2

(12) United States Patent
Balducci et al.

(10) Patent No.: US 6,838,406 B2
(45) Date of Patent: Jan. 4, 2005

(54) PROCESS FOR THE PREPARATION OF MFI-TYPE ZEOLITIC CATALYSTS

(75) Inventors: Luigi Balducci, Mortara (IT); Leonardo Dalloro, Bollate (IT); Alberto Cesana, Carate Brianza (IT); Roberto Buzzoni, San Mauro Torinese (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/295,866

(22) Filed: Nov. 18, 2002

(65) Prior Publication Data

US 2003/0125545 A1 Jul. 3, 2003

(30) Foreign Application Priority Data

Nov. 23, 2001 (IT) .................................... MI2001A2470

(51) Int. Cl.[7] ........................... B01J 29/40; B01J 29/89

(52) U.S. Cl. ............................ 502/71; 502/60; 502/64; 502/77

(58) Field of Search ............................ 502/60, 63, 64, 502/71, 77

(56) References Cited

U.S. PATENT DOCUMENTS

| | | | |
|---|---|---|---|
| 4,359,421 A | * 11/1982 | Bell et al. | 540/535 |
| 6,337,296 B1 | 1/2002 | Balducci et al. | |
| 6,403,514 B1 | 6/2002 | Mantegazza et al. | |

FOREIGN PATENT DOCUMENTS

| | | |
|---|---|---|
| EP | 0 215 579 | 3/1987 |
| EP | 0 791 558 A1 | 8/1997 |
| EP | 0 906 784 A2 | 4/1999 |
| EP | 1 002 577 A1 | 5/2000 |
| EP | 1 106 576 A1 | 6/2001 |

* cited by examiner

*Primary Examiner*—Christina Ildebrando
(74) *Attorney, Agent, or Firm*—Oblon, Spivak, McClelland, Maier & Neustadt, P.C.

(57) ABSTRACT

The present invention relates to a process for the preparation of zeolitic catalysts of the MFI type in spheroidal form.

The process consists in emulsifying and consolidating in paraffinic hydrocarbons, in the presence of a non-ionic surface-active agent or a suitable combination of a non-ionic surface-active agent and a cationic surface-active agent, a dispersion of particles of zeolitic material of the MFI type in a silica sol.

20 Claims, No Drawings

PROCESS FOR THE PREPARATION OF MFI-TYPE ZEOLITIC CATALYSTS

BACKGROUND OF THE INVENTION

1. Field of the Invention

The present invention relates to a process for the preparation of catalysts based on MFI-type zeolite in spheroidal form.

2. Description of the Background

More specifically, the present invention relates to a process for the preparation of catalysts based on MFI-type zeolite active in rearrangement reactions of oximes to amides and suitable for use in gas phase in fluid bed and moving bed reactors.

The invention also relates to the catalysts obtained by means of the above processes and to the processes in which they are used.

MFI-type zeolites, in particular those with a high silica/alumina ratio (U.S. Pat. No. 4,359,421) and, more generally, those with a low content of trivalent heteroelements (patent EP 242,960), are known in literature as basic materials for the preparation of catalysts which can be used in numerous reactions and in particular in rearrangement reactions of oximes to amides; among these, particular importance is given to reactions carried out in gaseous phase. For example, patent EP 234,088 describes a method for the preparation of ϵ-caprolactam consisting in putting cyclohexanone-oxime, in the gaseous state, in contact with crystalline alumino-silicates having well-defined physico-chemical characteristics and preformed in the form of granules (24÷48 mesh).

These materials, however, consisting of the active phase only, have limited possibilities of being used in industrial reactors; if, in fact, fluid bed or moving bed reactors are to be used for the catalytic process, the catalysts should preferably have the form of microspheres, with an average diameter of 30÷100 μm and characterized by a high resistance to interparticle attrition and attrition against the walls of the reactors; if, on the other hand, fixed bed reactors are used, the catalysts should have the typical forms for this technology (spheres, tablets, etc.), with dimensions in the order of several millimeters and characterized by a good loading resistance.

The cohesion between the individual particles of the micro-crystalline zeolitic material is generally poor, and consequently the resistance to attrition and loading is usually obtained by combining the zeolitic material with compounds of an inorganic nature (ligands) in the forming phase.

Catalysts based on zeolites, suitable for use in fluid bed or moving bed reactors and with the specific characteristics mentioned above, are widely described in the known art and are mainly used in catalytic cracking processes (FCC, Fluid Catalytic Cracking catalysts).

In the forming of the above catalysts, normally effected with the known spray-drying technique, when microspheres with a diameter <100 μm are required, silicas and aluminum oxides in the colloidal state or silico-aluminates are used to give the microspheres a higher resistance to attrition. The use of these ligands in spherulization processes of zeolitic materials of the MFI type can however, in some applications, jeopardize their catalytic performances, as these ligands are not entirely inactive in the above reactions.

It is known, for example, that in the catalytic rearrangement reaction of oximes to amides, the presence of ligands significantly jeopardizes the selectivity of the zeolitic catalyst and the deterioration of the catalytic performances caused by the formation of organic pitches [Catalysis Letters 17 (1993), 139–140; Catalysis Today 38 (1997), 249–253].

To overcome this problem, patent EP 576,295 suggests, for example, that the zeolitic material in spherical form be preformed by means of spray-drying without any addition of ligands and that the microspheres be subjected, in a subsequent process phase, to thermal treatment in water to increase their hardness.

In a more recent patent (EP 1,002,577), on the other hand, the use of silica ligands is suggested, which, when synthesized by the acid hydrolysis of silicon alkoxides, are practically inert in rearrangement reactions of oximes to amides. With these ligands and by means of a forming process via emulsion, catalysts are obtained in the form of microspheres characterized by a content of silica ligand, expressed as $SiO_2$, equal to or higher than 30% by weight and by a resistance to attrition suitable for carrying out the rearrangement reaction in fluid bed or moving bed reactors.

Although the silica ligand is practically inert, the high percentage of $SiO_2$ in these catalysts tends however to jeopardize the catalytic performances of the active phase. Furthermore, the forming process described proves to be complex, costly and difficult to develop on a technologically significant scale.

SUMMARY OF THE INVENTION

In the area of forming methods via emulsion, a process has now been found which allows catalysts to be obtained in the form of microspheres based on zeolitic compounds of the MFI type, characterized by a content of silica ligand (expressed as $SiO_2$) ranging from 15 to 20% by weight, considerably lower than that of the known compositions of the state of the art (≧30% $SiO_2$).

DETAILED DESCRIPTION OF THE PREFERRED EMBODIMENTS

With respect to these, the reduced concentration of the silica ligand creates an improvement in the catalytic performances of the materials, increasing their selectivity in the rearrangement reactions of oximes to amides up to values close to the characteristic values of the zeolitic active phase not formed in spherules; this occurs without jeopardizing the resistance of the microspheres to attrition which, expressed according to the Davison Attrition Index (D.I.) method ["Advances in Fluid Catalytic Cracking" Catalytica, Mountain View, Calif., Part 1, 1987, page 355], is maintained at the levels (D.I. ≦6) normally required for carrying out reactions in gas phase in fluid bed or moving bed reactors.

Another advantage, associated with the low concentration of the silica ligand in the catalytic composition, relating to the productive capacity $[Kg^*(m^3h)^{-1}]$ of the catalyst which, expressed as quantity (Kg) of oxime converted per hour (h) and per volume unit ($m^3$) of catalyst (or catalytic bed) is increased by at least 10% with respect to that of the known compositions in the state of the art (EP 1,002,577).

The process of the invention also has the advantage of being less complex, of having a higher productivity and of using a hydrocarbon, as organic medium, which, in addition to being more economic than the higher alcohols previously used, can be easily recovered from the reaction mixture.

At the end of the reaction, in fact, a solid phase (corresponding to the catalyst produced), an aqueous liquid phase (corresponding to what remains of the aqueous solvent of the hybrid sol) and an organic liquid phase (corresponding to the hydrocarbon used for the emulsion), are present in the preparation reactor of the catalyst. The phases tend to stratify naturally in the reactor and can be easily separated; the hydrocarbon can therefore be used again without any purification.

Viceversa, the organic medium (decanol) adopted with the method described in EP 1,002,577, formed a mixture with the organic base of which the starting mixture (cyclohexylamine and ethanol) consisted, thus requiring prior purification for re-use.

The process, object of the invention, consists in emulsifying and consolidating (gelatinizing), in an organic medium and in the presence of a suitable combination of surface-active agents, a dispersion of particles of the zeolitic material in a silica sol having a suitably controlled pH.

In particular, the forming process of the catalyst via emulsion/gelation comprises the following steps:

a) preparation of a silica sol by the hydrolysis of silicon alkoxides in an aqueous medium and under acid conditions;
b) mixing of the silica sol with an aqueous dispersion of MFI-type zeolite particles;
c) basification of the hybrid sol (b) up to values not higher than pH 6.0;
d) emulsification/gelation of the hybrid sol in paraffinic, cycloparaffinic or aromatic hydrocarbons, in the presence of a non-ionic surface-active agent or a suitable combination of a non-ionic and a cationic surface-active agent.

Whereas passages a) and b) of the process relating to the preparation of the hybrid sol do not differ from what is known in the state of the art (for example patent EP 1,002,577), passages c) and d) represent the innovative aspect of the process, object of the invention, as they are determinant in minimizing the quantity of silica ligand in the catalytic composition, without comprising its morphological-granulometric characteristics and resistance to attrition.

In particular, in the process, object of the invention, the consolidation (gelation) of the micro-drops of hybrid sol (b) emulsified in the organic medium, is controlled by the combined action of the pH (step c) and of the cationic surface-active agent: whereas the pH of the hybrid sol regulates its gelation kinetics, the presence of the cationic surface-active agent in the emulsifying medium allows the sol-gel transition to be controlled, preventing, in this phase of the process, the production of strong interparticle aggregation phenomena with negative effects on the morphology of the materials.

It is known that in processes via emulsion/gelation of silica sol in paraffinic hydrocarbons, it is necessary to operate in the presence of emulsifying agents (surface-active agents) of the non-ionic type characterized by HLB (Hydrophile-Lipophile-Balance) values of less than 9, among which sorbitan monooleate (HLB 4.3) is one of the most well known in the state of the art (Nat. Academy Press, "Using Oil Spill Dispersants on the Sea" Chap. 2—Chemistry and Physics of Dispersants and Dispersed Oil pages 28–80 (1989)).

In the process, object of the invention, the use of surface-active agents with these physico-chemical characteristics may not be sufficient to control the morphology of the materials; this is due to flocculation/aggregation phenomena which arise during the consolidation of the micro-drops of hybrid sol dispersed in the emulsifying medium. In these cases, this drawback can be overcome by using, in a combination with the non-ionic emulsifying agent, a cationic surface-active agent (quaternary ammonium salt) of the type $[N R_1 R_2 R_3 R_4]^+ X^-$ wherein X is Cl, Br and $R_1$ $R_2$ $R_3$ $R_4$ are $C_nH_{2n+1}$ alkyl groups, the same or different, with $1 \leqq n \leqq 18$.

The use of hexadecyltrimethylammonium bromide (or cetyltrimethylammonium bromide; $R_1$, $R_2$, $R_3$=$CH_3$; $R_4$=$C_{16}H_{33}$; X=Br) combined with the non-ionic surface-active agent sorbitan monooleate (Span 80, trade-name) characterized by HLB=4.3, has proved to be particularly suitable for the purpose.

By means of this morphological control method, it has been possible to spherulize catalytic compositions based on MFI-type zeolites containing the silica ligand in a quantity ranging from 15 to 20% by weight (expressed as $SiO_2$), at the same time maintaining a resistance to attrition equivalent to or higher than that which can be obtained with other known techniques in the state of the art, in the presence of a much higher quantity of ligand, for example higher than 30% by weight. In particular, these catalytic compositions consist of microspheres with an average diameter varying from 30 to 200 $\mu$m and characterized by a resistance to attrition, expressed as D.I. (Davison Index)<6.0. These characteristics are extremely suitable for rearrangement reactions of oximes to amides in gas phase in fluid bed or moving bed reactors.

The process is based on the use of a hybrid sol (particles of MFI-type zeolite dispersed in a silica sol) prepared with the technique known in the state of the art, as described for example in patent EP 1,002,577.

In the preparation of silica oligomers (silica sol, step a) silicon alkoxides, such as tetra-ethyl-orthosilicate (TEOS), are used as silica precursors. The hydrolysis of these compounds in an aqueous medium catalyzed by acids, together with the effect of the hydrolysis conditions on the physico-chemical characteristics of silica oligomers are widely described in the state of the art [C. J. Brinker, G. W. Sherer "Sol-Gel Science. The Physic and Chemistry of sol-gel processing", Academic Press Inc., 1990].

Silica oligomers suitable for the purposes of the invention are preferably obtained by the hydrolysis of TEOS in an aqueous medium and in the presence of mineral acids, such as, for example, HCl and $HNO_3$, the molar ratio $H_2O$/TEOS being regulated to between 10 and 25 and the pH between 1.5 and 3.0. The hydrolysis reaction is carried out maintaining the reagents (TEOS and acid aqueous solution) under mechanical stirring for times normally varying from 1 to 3 hours at temperatures usually ranging from 20 to 40° C. The concentration of alcohol in the final reaction mixture (in particular ethanol deriving from the hydrolysis of TEOS) can be suitably adjusted in a subsequent operation.

The solution of silica oligomers, for example, can be dealcoholated and concentrated by distillation at reduced pressure and at temperatures lower than 30° C.

Zeolitic compounds of the MFI type which can be used for the purposes of the present invention can be selected from Silicalite-1 or zeolites containing aluminum or other trivalent or tetravalent hetero-atoms, such as, for example, those of Group III (B, Ga, In) or Ti.

In particular, zeolitic compounds of the MFI type suitable for the rearrangement reaction of oximes to amides can be selected from Silicalite-1 or zeolites with a low content of aluminum (molar ratio Si/Al>1000) or of other hetero-atoms (molar ratio Si/hetero-atom>1000). As described in the state of the art, these materials are obtained by hydrothermal synthesis from a mixture of reagents comprising a high purity silica precursor (for example TEOS), water, alcohols, organic amines or cations of tetraalkyl-ammonium ($R_nN^+$) as crystallization control (templating agents) of the zeolitic material.

The reaction product, consisting of individual micro-crystalline particles, having dimensions normally lower than 1 μm, is generally separated from the mother liquor by centrifugation, repeatedly washed with water to remove the excess templating agent and finally dried and calcined. Alternatively, the reaction product can be spray-dried.

In the preparation process of the catalysts, object of the present invention, the zeolitic intermediate centrifuged and optionally washed with water, is advantageously used.

In the process according to the invention, the zeolitic material is dispersed in an aqueous medium, using mechanical dispersing agents or also with ultrasonic devices, the dispersion conditions being controlled so that the dimensions of the materials reach values close to those of the individual particles (normally lower than 1μ). In the process, object of the invention, the zeolitic intermediate centrifuged and optionally washed with water, in the form of thickened product, is advantageously and preferably used. The control of the dispersion degree of the zeolitic material in the aqueous medium is particularly important if dried zeolitic intermediates and, above all, zeolitic materials subjected to thermal treatment at a temperature ≧500° C., are used in the process.

Under the preferred conditions in which the centrifuged and optionally washed zeolitic intermediate is used, the pH of the resulting aqueous solution is normally alkaline due to the incomplete removal of the templating agent. To avoid the appearance of undesired polymerization or gelation phenomena of the acid silica oligomers in the subsequent mixing operation, the above dispersions are acidified to pH values lower than or equal to 5.0.

The acidification can be effected with solutions of mineral or organic acids and, under the preferred conditions, with the type of acid used in the preparation of the silica ligand, such as HCl and $HNO_3$. The quantity of acid is preferably controlled so that the pH of the resulting ligand/zeolite mixture (hybrid sol, step b) is lower than 4.0, more preferably ranging from 2.0 to 3.0.

With respect to the composition of the above mixture, the weight ratio between the zeolitic compound of the MFI type and the silica ligand (both expressed as $SiO_2$) can be extended to values of 5.5 inclusive, thus obtaining catalytic compositions in which the minimum content of silica ligand is about 15% by weight; in the preferred compositions, the content of silica ligand ranges from about 20% by weight to about 15% by weight.

The concentration of MFI-type zeolite in the aqueous solution of the silica ligand normally ranges from 15 to 25% by weight.

The hybrid sol deriving from step b) is subsequently (step c)) basified to a definite pH value.

The objective of this operation is to control the consolidation (gelation) rate of the micro-drops dispersed in the organic emulsifying medium. In order to obtain materials with suitable morphological-granulometric characteristics, the pH of the hybrid sol is raised up to a value not higher than 6.0 and, preferably, within a range of values between 5.2 and 5.8. Operating under the preferred pH conditions, the gelation time normally ranges from 15 to 60 minutes.

The basification of the hybrid sol is usually carried out at room temperature by the addition of an aqueous inorganic or organic base solution, preferably a solution of ammonium hydroxide, for example 1 M.

The emulsification/gelation operation of the hybrid sol (step d)) is effected in paraffinic or aromatic hydrocarbons in the presence of a pair of non-ionic and cationic surface-active agents.

Among the paraffinic hydrocarbons having general formula $C_nH_{2n+2}$, compounds with values of n varying from 6 to 16, are generally used, such as, for example, n-hexane, n-decane, n-hexadecane or their isomers or mixtures of more easily available and economic hydrocarbons (for example ligroins with boiling point of 60÷100, Kerosenes), or cycloparaffinic compounds (for example, cyclohexane). Among aromatic hydrocarbons, which are less preferred than paraffinic hydrocarbons, toluene and xylenes, for example, can be used.

Surface-active agents with HLB (Hydrophile-Lipophile-Balance) values lower than 9 are normally used as emulsifying agents of the non-ionic type; sorbitan mono-esters with an HLB varying from 4 to 7 are preferably used, in particular sorbitan monooleate (trade-name Span 80, HLB 4.3).

Quaternary ammonium salts of the type $[N R_1 R_2 R_3 R_4]^+ X^-$ wherein X=Cl, Br and $R_1 R_2 R_3 R_4=C_nH_{2n+1}$ alkyl groups, the same or different with $1 \leqq n \leqq 18$, are used as cationic surface-active agents.

Hexadecyltrimethylammonium bromide (or cetyltrimethylammonium bromide; $R_1 R_2 R_3=CH_3$; $R_4=C_{16}H_{33}$, X=Br) combined with the non-ionic surface-active agent sorbitan monooleate, is particularly suitable for the purpose. The concentration of the latter in the organic emulsifying medium normally ranges from 5 g/l to 15 g/l, whereas the concentration of cetyltrimethylammonium bromide (CTMABr) is usually ≧0.3 g/l and is regulated so that the weight ratio Span 80/CTMABr ranges from 10 to 40, preferably from 15 to 25.

In the emulsification operation in the presence of the above pair of surface-active agents, the volumetric ratio between the continuous phase (hydrocarbon) and the dispersed phase (hybrid sol) is normally ≧2.5 and, preferably, ranging from 3.0 to 5.0.

The emulsification/gelation temperature of the hybrid sol, generally ranging from 20 to 25° C., can vary within a wide range of values in relation to the chemical nature of the emulsifying medium. For example, in decane, the operation can be carried out at a temperature ranging from 15 to 50° C.; to avoid the consolidation (or gelation) of the hybrid sol occurring too rapidly (at a T of ~50° C.) or too slowly (at a T of ~15° C.) under these temperature limit conditions, suitable corrections must be made to the pH of the hybrid sol, so that the gelation time is ≧15 minutes or less than an hour. As is known in the state of the art, the control of the dimensions of the microspheres, for example from 30 to 200 μm, can be effected by acting on the rotation rate of the stirrer of the emulsification reactor and/or on the viscosity of the emulsifying medium.

After gelation of the hybrid sol and in order to complete its consolidation, the dispersion of the microspheres in the emulsifying medium is maintained under stirring for at least 0.5 hours and generally for times ≦3 hours. The separation of the material is then effected, following the operations and procedures known in the state of the art. For example, after filtration, the catalyst is washed with organic solvent (for example with alcohols, such as ethanol, propanol and isopropanol, or ketones, such as acetone), subsequently dried (for example, at room temperature or at T≦110° C.) and finally calcined in an oxidizing atmosphere (air) at temperatures higher than 450° C., normally within the temperature range typical of zeolitic materials (500÷550°

C.), with a heating rate normally in the order of 50° C./h and for times in the order of 1÷10 hours, preferably for 4÷8 hours.

The materials prepared with the above procedure consist of microspheres whose dimensions can vary from 30 to 200 μm in relation to the emulsification conditions of the ligand/zeolite mixture. These materials, as a result of their morphological-granulometric and physico-chemical characteristics specified above, can be conveniently used in processes for the preparation in gas phase of amides by means of the catalytic rearrangement of oximes.

Among amides which, as is known, form an important group of intermediates, ε-caprolactam is of particular importance, especially for the preparation of polyamide resins and synthetic fibres.

In particular, the catalysts, object of the invention, can be advantageously used in the rearrangement reaction of cyclohexanone-oxime to ε-caprolactam with a process in gas phase, consisting in bringing cyclohexanone-oxime vapours in contact with the catalyst.

Following the technique known in the state of the art (EP 1,002,577), this reaction, for example, can be carried out at a pressure ranging from 0.05 to 10 bars and at a temperature ranging from 250 to 500° C., preferably from 300 to 450° C.

More specifically, the cyclohexanone-oxime is fed to a reactor containing the catalyst, in vapour phase and in the presence of one or more solvents and, optionally, also an uncondensable gas.

Under the preferred conditions, the cyclohexanone-oxime is dissolved in a mixture of solvents, subsequently described, at a concentration ranging from 5 to 25% by weight and preferably from 6 to 15%; the solution thus obtained is then vaporized and fed to the reactor.

Preferred solvents are of the $R_1$—O—$R_2$ type wherein $R_1$ is a $C_1$–$C_4$ alkyl chain and $R_2$ can be a hydrogen atom or an alkyl chain containing a number of carbon atoms lower than or equal to $R_1$.

Alcohols with a $C_1$–$C_2$ alkyl chain are particularly preferred. These solvents can be used alone or mixed with each other, or combined with an aromatic hydrocarbon such as benzene or toluene.

The feeding rate of the cyclohexanone-oxime is controlled so that the WHSV (Weight Hourly Space Velocity) value, expressed as kg of cyclohexanone-oxime/(kg of catalyst*h), ranges from 0.1 to 50 $h^{-1}$, preferably from 0.5 to 20 $h^{-1}$.

In said reaction, the catalysts, object of the invention and characterized by a high content in active phase (≧80%), have higher catalytic performances than those of the materials (max. 70% of active phase) known in the state of the art and synthesized with silica ligands of the same physico-chemical nature (EP 1,002,577). In particular, on carrying out the reaction under identical WHSV conditions (referring to the weight of active component in the catalyst), the composition richer in active phase positively influences the selectivity of the reaction to ε-caprolactam.

Some illustrative and non-limiting examples are provided hereunder for a better understanding of the present invention and for its embodiment.

EXAMPLE 1

Preparation of Silicalite-1

The Preparation is Described of Silicalite-1, Active Phase of the Catalyst.

632 g of an aqueous solution at 20% of Tetra-propyl-ammonium hydroxide (TPAOH) are charged into a 3 liter Pyrex reactor, flushed with nitrogen. 555 g of Tetra-ethyl-orthosilicate (TEOS) are added dropwise, over a period of about 5 hours, under stirring and flushing with nitrogen. The following day, the solution is closed in a 5 liter autoclave inside a Teflon container. Three washings are effected with nitrogen at about 10 atm. The hydrothermal synthesis is then carried out at 140° C. for 24 hours with stirring at 80 revs/minute.

The solid dried with a spray-dryer is separated from part of the suspension obtained. The suspension, coming from the synthesis, containing the zeolite, is fed to the spray-dryer at a rate of 1.5 liters/hour, and an inlet temperature of 230° C.

The solid recovered is kept dry, without undergoing further treatment.

Another aliquot of suspension is centrifuged, separating the solid product, which is washed with distilled water until the washing water reaches pH≈7. The product obtained is kept humid and is spherulized as described in the following examples.

Part of the centrifuged solid is dried at 120° C., calcined at 550° C. for 4 h and subsequently sieved at a size of 42+80 mesh for the catalytic activity test (Example 6).

The X-ray diffraction of the calcined product identifies the product as MFI zeolite.

Chemical analysis carried out by means of ICP-AS shows low contents of Na, K, Al, Fe (<30 ppm).

Morphological analysis of the material, carried out by means of ASAP 2000 (nitrogen absorption isotherm at 77K), gives the following result: A.S.E.=55.1 $m^2/g$, micropore volume=0.183 $cm^3/g$, mesopore volume=0.264 $cm^3/g$.

The bulk density of the catalyst sieved at a size of 42÷80 mesh, is 0.63 $g/cm^3$.

The catalysts thus prepared must be subjected to a forming process to acquire the necessary characteristics (spherical shape, mechanical resistance) for use in fluid bed or moving bed reactors.

EXAMPLE 2

Preparation of the Hybrid Sol of Silicalite-1 and Silica Sol

The preparation is described of a hybrid sol of Silicalite-1 and Silica sol, an intermediate for the preparation of composite material containing 80% by weight of Silicalite-1.

A. Preparation of the Silica Ligand (Silica Sol).

213 g of TEOS (Aldrich; titer 98%), 285 g of demineralized water and 3.0 g of HCl 1N are charged into a 1000 $cm^3$ cylindrical reactor equipped with a mechanical stirrer, thermometer and external cooling bath. The reagents are kept under stirring at a temperature of 25÷30° C. for the time necessary for obtaining a limpid solution (about 35 minutes); the stirring is then continued for a further 120 minutes. The acid silica sol thus obtained (pH=2.5; titer $SiO_2$=11.97%) is preserved in a refrigerator at 5° C. until the moment of use.

B. Preparation of the hybrid sol. The intermediate product (titer of Silicalite-1=75.6%), centrifuged and washed, as described in Example 1, is used as Silicalite precursor. 19.9 g of the precursor (equal to 15.04 g of Silicalite-1) are dispersed for 120 minutes in 50 $cm^3$ of demineralized water by means of a Teflon anchor magnetic stirrer and, subsequently, for a further 15 minutes with an ultrasonic probe (Sonifier, Cell Disruptor B15; Branson).

The aqueous suspension of Silicalite-1 is acidified from pH≈10.5 to pH=2.5 with a solution of HCl 1N and then mixed with 31.2 g of the silica sol A) for about 3 minutes by means of a magnetic stirrer.

C. Basification of the hybrid sol. The pH of the hybrid sol prepared in B) is subsequently brought to a value of 5.7 by the dripping of a 1M solution of $NH_4OH$ in ~2÷3 minutes; a small aliquot (3÷4 $cm^3$) of the hybrid sol is conserved in a test-tube to measure the gelation time.

EXAMPLE 3

Preparation of a Microspheroidal Catalyst Consisting of Silicalite-1 and Silica.

The preparation is described of a Silicalite-1/Silica composite material containing 80% by weight of Silicalite-1, using the hybrid sol of Example 2.

D1. Emulsification/gelation. The hybrid sol (~100 $cm^3$) is transferred to a cylindrical reactor (internal diameter 100 mm, volume 1000 $cm^3$) previously charged, at a temperature of 23° C., with 400 $cm^3$ of a solution of 10 g/l of sorbitan monooleate (Span 80; Fluka) and 1 g/l of hexadecyltrimethylammonium bromide (Aldrich) in n-decane (Fluka, titer 98%); the mechanical stirrer with 6 radial blades is then activated, regulating its velocity at 500 revs per minute. After ~20 minutes, the hybrid sol consolidates; the stirring is continued for a further 60 minutes, regulating the velocity at 350 revs per minute, and the solid is then left to deposit, for about 60 minutes. The thickened product is filtered and washed with acetone; after drying at room temperature, the material is calcined in an oxidizing atmosphere (air) at 550° C. for 4 hours with a heating rate of 50° C./h.

The composite material thus obtained contains 80% by weight of Silicalite-1.

The median diameter (D50) of the microspheres, measured with a Coulter LS130 apparatus, is equal to 100 $\mu$m.

The resistance to attrition of the catalyst of Example 3 was verified according to the Davison Attrition Index (D.I.) method ["Advances in Fluid Catalytic Cracking" Catalytica, Mountain View, Calif., Part 1, 1987, page 355] and proved to be in line with the values of a fresh catalyst according to the specification of use in a FCC reactor (D.I. <6).

EXAMPLE 4

Preparation of a Microspheroidal Catalyst Consisting of Silicalite-1 and Silica.

The preparation is described of a Silicalite-l/Silica composite material containing 80% by weight of Silicalite-1, as an alternative to that described in Example 3, using the hybrid sol of Example 2.

D2. Emulsification/gelation. The same procedure is adopted as in Example 3, varying the quantities of sorbitan monooleate, equal to 10 g/l, and hexadecyltrimethylammonium equal to 0.75 g/l in the solution of n-decane.

The composite material thus obtained contains 80% by weight of Silicalite-1.

The median diameter (D50) of the microspheres is equal to 90 $\mu$m.

The resistance to attrition of the catalyst of Example 4 was verified and proved to be D.I.<6.

EXAMPLE 5

Preparation of a Microspheroidal Catalyst Consisting of Silicalite-1 and Silica.

The preparation is described of a Silicalite-1/Silica composite material containing 80% by weight of Silicalite-1, as an alternative to those described in Examples 3 and 4, using the hybrid sol of Example 2.

D3. Emulsification/gelation. The same procedure is adopted as in Example 3, with a different hydrocarbon solution. In this case 400 g of n-hexane are used (Fluka, titer 98%) containing 8.5 g/l of sorbitan monooleate.

The composite material thus obtained contains 80% by weight of Silicalite-1.

The resistance to attrition of the catalyst of Example was verified and proved to be D.I. <6.

EXAMPLE 6

Catalytic Activity Tests of Silicalite-1, Active Phase of the Catalyst.

The operating procedure is described for the catalytic activity test with Silicalite-1, active phase of the catalyst.

The catalyst described in Example 1 (sieved at a size of 42÷80 mesh) was tested in a fixed bed tubular reactor having a length equal to 200 mm and a diameter of 11.5 mm. A thermocouple sheath having $\phi_{ext.}$=4 mm was positioned inside the reactor. 0.5 grams of catalyst diluted with quartz up to a volume of 2 $cm^3$ are charged into the reactor and positioned in the central part of the reactor between two layers of quartz.

The cyclohexanone-oxime (CEOX) is fed in solution with toluene, methanol and water. The CEOX solution is preheated before being charged into the reactor and vaporized and mixed with nitrogen directly in the reactor before coming into contact with the catalyst.

Before carrying out the test, the catalyst is heated to the reaction temperature in a stream of nitrogen and dried. It is then treated with the mixture of solvents alone before being used in the reaction. The test begins by sending the CEOX solution onto the catalyst.

The mixture of effluent vapours from the reactor is condensed and samples are collected for evaluating the catalytic performances. The samples are analyzed by gaschromatography and the catalytic performances are evaluated by calculating the conversion of CEOX and selectivity to $\epsilon$-caprolactam (CPL).

Table 1 indicates the operating conditions and catalytic performances at the $1^{st}$ and $20^{th}$ hour of the test in the rearrangement reaction of CEOX to CPL.

EXAMPLES 7–8–9

Catalytic Activity Tests of Microspheroidal Catalysts Consisting of Silicalite-1 and Silica The catalytic activity tests are described, with Silicalite-1 and silica composite materials.

The catalysts described in Examples 3–4–5 were tested as described in Example 6. In order to respect the same WHSV, the different tests were effecting by varying the catalyst charge and then the contact time.

Tables 2–3–4 indicate the catalytic performances at the $1^{st}$ and $20^{th}$ hour of the test.

Comparative Example 1

Preparation of a Microspheroidal Catalyst Consisting of Silicalite-1 and Silica According to the Procedure Described in Patent EP 1,002,577).

The preparation is described of a Silicalite-1/Silica composite material containing 70% by weight of Silicalite-1.

A. Preparation of the Silica Ligand (Silica Sol).

213 g of TEOS (Aldrich; titer 98%), 285 g of demineralized water and 3.0 g of HCl 1N are charged into a 1000 $cm^3$ cylindrical reactor equipped with a mechanical stirrer, thermometer and external cooling bath. The reagents are kept under stirring at a temperature of 25÷30° C. for the time necessary for obtaining a limpid solution (about 35 minutes); the stirring is then continued for a further 60 minutes. The acid silica sol thus obtained (pH=2.5; titer $SiO_2$=11.98%) is preserved in a refrigerator at 5° C. until the moment of use.

B. Preparation of the hybrid sol. The product, washed and thickened, as described in Example 1 (titer of Silicalite-1=75.6%), is used as Silicalite-1 precursor. 15.9 g of the precursor (equal to 12.0 g of Silicalite-1) are dispersed for 60 minutes in 60 $cm^3$ of demineralized water by means of a Teflon anchor magnetic stirrer and, subsequently, for a further 15 minutes with an ultrasonic probe (Sonifier, Cell Disruptor B15; Branson); after dilution with 60 $cm^3$ of ethanol, the ultrasonic treatment is continued for a further 10 minutes.

C. Basification of the hybrid sol. The hydro-alcohol suspension of Silicalite-1, consisting of particles with an average diameter of 0.22 $\mu$m (Coulter analyzer, Model N4, 5D), is subsequently acidified from pH=10.5 to pH=2.5 with a solution of HCl 1N and is then mixed with 43 g of the silica sol A) for about 3 minutes by means of a magnetic stirrer.

D. Emulsification/gelation. The mixture thus obtained (about 185 $cm^3$) is transferred to a cylindrical reactor (internal diameter 100 mm, volume 1000 $cm^3$) previously charged with 500 $cm^3$ of 1-decanol (Fluka, titer 98%); the mechanical stirrer with 6 radial blades is then activated, regulating its velocity at 800 revs per minute. After 10 minutes, the emulsion is rapidly discharged from the bottom of the reactor into an underlying container containing 300 $cm^3$ of a solution at 10% (v/v) of cyclohexylamine (Aldrich, titer 99%) in 1-decanol, the stirring being maintained at room temperature. The stirring is continued for a further 60 minutes; the solid is then left to deposit, for about 60 minutes, and is subsequently filtered and repeatedly washed with ethanol. After drying at room temperature, the composite material is calcined in an oxidizing atmosphere (air) at 550° C. for 4 hours with a heating rate of 50° C./h.

The composite material thus obtained contains 70% by weight of Silicalite-1.

The median diameter (D50) of the microspheres, measured with a Coulter LS130 apparatus, is equal to 50 $\mu$m.

The resistance to attrition of the catalyst of Comparative Example 1 was verified according to the Davison Attrition Index (D.I.) method and proved to be in line with the values of a fresh catalyst according to the specification of use in a FCC reactor (D.I. <6).

Comparative Example 2

Catalytic Activity Tests of the Microspheroidal Catalyst Consisting of Silicalite-1 and Silica, Containing 70% by Weight of Silicalite-1

The catalyst described in Comparative Example 1 was tested as in Example 6. In order to respect the same WHSV, the test was effected varying the catalyst charge and, then, the contact time.

Table 5 indicates the catalytic performances at the $1^{st}$ and $20^{th}$ hour of the test.

TABLE 1

| OPERATING CONDITIONS | | |
|---|---|---|
| Temperature (° C.) | 350 | |
| WHSV ($h^{-1}$) (*) | 4.5 | |
| Contact time (s) (#) | 0.11 | |
| CEOX partial pressure (bar) | 0.034 | |
| MeOH/CEOX (molar ratio) | 10 | |
| Toluene/CEOX (molar ratio) | 10 | |
| $N_2$/CEOX (molar ratio) | 8 | |
| $H_2O$/CEOX (molar ratio) | 0.15 | |
| Catalyst charge (g) | 0.5 | |
| **CATALYTIC PERFORMANCES Catalyst of Example 1** | | |
| Time (h) | 1 | 20 |
| CEOX conversion (%) | 99.8 | 75.3 |
| Selectivity to CPL (%) | 93.6 | 95.4 |
| Rearrangement reactor productivity (kg CEOX fed/(h * liter catalyst) | 2.8 | |

(*) WHSV refers for the feeding to CEOX alone and for the catalyst to the active phase alone.
(#) The contact time refers to the whole feeding mixture and to the composite catalyst.

TABLE 2

| CATALYTIC PERFORMANCES ($) Catalyst of Example 3 | | |
|---|---|---|
| Time (h) | 1 | 20 |
| CEOX conversion (%) | 99.4 | 76.8 |
| Selectivity to CPL (%) | 93.0 | 94.1 |
| Rearrangement reactor productivity (kg CEOX fed/(h * liter catalyst) | 2.3 | |

($) The operating conditions used are the same as those indicated in Table 1

TABLE 3

| CATALYTIC PERFORMANCES ($) Catalyst of Example 4 | | |
|---|---|---|
| Time (h) | 1 | 20 |
| CEOX conversion (%) | 99.2 | 77.0 |
| Selectivity to CPL (%) | 93.2 | 94.4 |
| Rearrangement reactor productivity (kg CEOX fed/(h * liter catalyst) | 2.3 | |

($) The operating conditions used are the same as those indicated in Table 1

TABLE 4

| CATALYTIC PERFORMANCES ($) Catalyst of Example 5 | | |
|---|---|---|
| Time (h) | 1 | 20 |
| CEOX conversion (%) | 99.9 | 88.6 |
| Selectivity to CPL (%) | 92.9 | 94.8 |
| Rearrangement reactor productivity (kg CEOX fed/(h * liter catalyst) | 2.3 | |

($) The operating conditions used are the same as those indicated in Table 1

TABLE 5

| CATALYTIC PERFORMANCES ($) Catalyst of Comparative Example 1 | | |
|---|---|---|
| Time (h) | 1 | 20 |
| CEOX conversion (%) | 99.7 | 84.7 |
| Selectivity to CPL (%) | 91.5 | 93.2 |
| Rearrangement reactor productivity (kg CEOX fed/(h * liter catalyst) | 2.0 | |

($) The operating conditions used are the same as those indicated in Table 1

What is claimed is:

1. A process for the preparation of zeollitic catalysts of the MFI type via emulsion/helation, comprising:

a) hydrolyzing silicon alkoxides in an aqueous medium and under acid conditions, thereby forming a silica sol;

b) mixing the silica sol with an aqueous dispersion of MFI-type zeolite particles;

c) adjusting the pH of the hybrid silica sol obtained in step (b) to a pH value not higher than 6.0; and d) emulsifying/gelating the hybrid sol in paraffinic, cycloparaffinic or aromatic hydrocarbons, in the presence of a non-ionic surface-active agent or a suitable combination of a non-ionic and cationic surface-active agent.

2. The process according to claim 1, wherein the cationic surface-active agent is a quaternary ammonium salt having the formula:

$$[NR_1R_2R_3R_4]^+X^-$$

wherein X is Cl or Br, and $R_1$, $R_2$, $R_3$, and $R_4$ are each $C_nH_{2n+1}$ alkyl groups, which are the same or different, with $1 \leqq n \leqq 18$.

3. The process according to claim 2, wherein the cationic surface-active agent is hexadecyltrimethylammonium bromide or cetyltrimethylammonium bromide (CTMABr).

4. The process according to claim 1, wherein the emulsification/gelation of the mixed sol is conducted with a non-ionic surface-active agent having a Hydrophilic-Lipophilic-Balance (HLB) value lower than 9.

5. The process according to claim 4, wherein the non-ionic surface-active agent is selected from the group consisting of sorbitan mono-esters with an HLB varying from 4 to 7.

6. The process according to claim 5, wherein the non-ionic surface-active agent is sorbitan monooleate.

7. The process according to claim 1, wherein the cationic surface-active agent is cetyltrimethylammonium bromide (CTMABr) and the non-ionic surface-active agent is sorbitan monooleate.

8. The process according to claim 7, wherein the concentration of cetyltrimethylammonium bromide (CTMABr) is $\leqq 0.3$ g/l and is regulated so that the weight ratio of sorbitan monooleate/CTMABr ranges from 10 to 40, whereas the concentration of sorbitan monooleate ranges from 5 g/l to 15 g/l.

9. The process according to claim 8, wherein the weight ratio of sorbitan monooleate/CTMABr ranges from 15 to 25.

10. The process according to claim 1, wherein the silica sol is obtained by the acid hydrolysis of tetraethyl ortho silicate.

11. The process according to claim 1, wherein the zeolitic compounds of the MFI type are selected from Silicalite-1 or zeolites containing aluminum or other trivalent or tctravalent hetero-atoms, such as those of Group III or Ti.

12. The process according to claim 11, wherein the zeolitic compounds of the MFI type are selected from Silicalite-1 or zeolites wherein the molar ratio Si/Al or Si/trivalent or tetravalent hetero-atoms is >1000.

13. The process according to claim 1, wherein the weight ratio between the zeolitic compound of the MFI type and the silica ligand in the mixture (b), both expressed as $SiO_2$, is brought to a value of 5.5.

14. The process according to claim 1, wherein the concentration of the MFI-type zeolite in the mixture (b) ranges from 15 to 25% by weight.

15. The process according to claim 1, wherein the pH of the hybrid sol (b) is adjusted to a value ranging from 5.2 to 5.8.

16. The process according to claim 1, wherein the pH of the hybrid sol (b) is adjusted by the addition of an aqueous solution of an inorganic or organic base.

17. The process according to claim 1, wherein the emulsification/gelation of the hybrid sol (b) is conducted in paraffinic hydrocarbons having the formula $C_nH_{2n+1}$ wherein n ranges from 6 to 16.

18. The process according to claim 1, wherein during the emulsification operation, the volumetric ratio between the hydrocarbon and hybrid sol is $\geqq 2.5$.

19. The process according to claim 18, wherein the volumetric ratio between the hydrocarbon and hybrid sol ranges from 3.9 to 5.0.

20. The process according to claim 1, wherein the emulsification/gelation operation is conducted at a temperature ranging from 20 to 25° C.

* * * * *